United States Patent
Toyota et al.

(10) Patent No.: US 11,085,535 B2
(45) Date of Patent: Aug. 10, 2021

(54) AUTOMATIC TRANSMISSION CONTROL METHOD AND CONTROL DEVICE

(71) Applicant: NISSAN MOTOR CO., LTD., Yokohama (JP)

(72) Inventors: Ryohey Toyota, Kanagawa (JP); Tomoyuki Nakano, Kanagawa (JP); Yutaka Kaneko, Kanagawa (JP); Kazuhiko Tazoe, Kanagawa (JP); Kouichi Kotsuji, Numazu (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/766,894

(22) PCT Filed: Nov. 9, 2018

(86) PCT No.: PCT/JP2018/041735
§ 371 (c)(1),
(2) Date: May 26, 2020

(87) PCT Pub. No.: WO2019/102881
PCT Pub. Date: May 31, 2019

(65) Prior Publication Data
US 2020/0300358 A1    Sep. 24, 2020

(30) Foreign Application Priority Data

Nov. 27, 2017 (JP) .............................. JP2017-227101

(51) Int. Cl.
*F16H 61/66* (2006.01)
*F16H 61/00* (2006.01)
(Continued)

(52) U.S. Cl.
CPC ............ *F16H 61/662* (2013.01); *F16H 9/18* (2013.01); *F16H 59/44* (2013.01); *F16H 59/72* (2013.01);
(Continued)

(58) Field of Classification Search
CPC ...... F16H 61/662; F16H 61/0031; F16H 9/18; F16H 59/44; F16H 59/72; F16H 2059/704
See application file for complete search history.

(56) References Cited

U.S. PATENT DOCUMENTS 6,243,638 B1 * 6/2001 Abo ................ F16H 61/66254
474/18
10,711,884 B2 * 7/2020 Toyota ................ F16H 61/662

FOREIGN PATENT DOCUMENTS

JP    2001-165293 A    6/2001

* cited by examiner

*Primary Examiner* — Tisha D Lewis
(74) *Attorney, Agent, or Firm* — Foley & Lardner LLP

(57) ABSTRACT

The control mode is switched between a first control mode configured to control the speed change pump based on an actual speed ratio being an actual speed ratio of the variator, and a second control mode configured to control the speed change pump based on an actual working pressure being an actual working pressure of the variator. In the first control mode, the actual speed ratio is calculated based on a detected value of a vehicle speed; and the speed change pump is controlled to cause the actual speed ratio to approach the target speed ratio. In the second control mode, the actual working pressure is detected and the speed change pump is controlled to cause the actual working pressure to approach a target working pressure corresponding to the target speed ratio. In a situation or a condition where the detection accuracy of the vehicle speed by the vehicle speed sensor
(Continued)

decreases, the control mode is switched from the first control mode to the second control mode.

7 Claims, 11 Drawing Sheets

(51) Int. Cl.
*F16H 9/00* (2006.01)
*F16H 61/662* (2006.01)
*F16H 9/18* (2006.01)
*F16H 59/44* (2006.01)
*F16H 59/72* (2006.01)
*F16H 59/70* (2006.01)

(52) U.S. Cl.
CPC ... *F16H 61/0031* (2013.01); *F16H 2059/704* (2013.01)

AUTOMATIC TRANSMISSION CONTROL METHOD AND CONTROL DEVICE

TECHNICAL FIELD

The present invention relates to an automatic transmission control method and control device using a vehicle speed to detect an actual speed ratio.

BACKGROUND ART

JP2001-165293A discloses an automatic transmission that performs control to set a target speed ratio according to a driving state and cause an actual speed ratio, which is an actual speed ratio of a variator, to approach the target speed ratio (paragraphs 0041 and 0042).

SUMMARY OF INVENTION

In JP2001-165293A, the actual speed ratio is calculated by dividing a rotation speed on the input side of the automatic transmission by a rotation speed on the output side of the automatic transmission. Herein, when a vehicle speed is used for calculating the rotation speed on the output side, a problem arises as follows. A vehicle speed sensor that detects a rotation speed of a drive wheel or a drive shaft of a vehicle is generally used for detecting the vehicle speed, but because of the characteristics of the vehicle speed sensor, its vehicle speed detection accuracy decreases in an extremely low rotation speed range. Therefore, when the vehicle speed is used for calculating the rotation speed on the output side, it is generally difficult to stably perform control using the actual speed ratio. It is conceivable to apply filtering to a detection value of the vehicle speed sensor at every moment to reduce the influence of fluctuation caused by the decrease in the detection accuracy, but in this case, when the vehicle speed is actually changed, such a change cannot be accurately grasped.

It is an object of the present invention to provide an automatic transmission control method and control device that take into account such a problem.

According to one aspect of the present invention, an automatic transmission control method for controlling an automatic transmission including a variator having a primary pulley, a secondary pulley, and a belt, the automatic transmission configured such that a winding diameter of the belt in the primary pulley or the secondary pulley is variable according to a working pressure of the variator formed by a speed change pump, is provided. The automatic transmission control method includes: setting a target speed ratio of the variator according to a driving state of a vehicle; switching between a first control mode configured to control the speed change pump based on an actual speed ratio being an actual speed ratio of the variator, and a second control mode configured to control the speed change pump based on an actual working pressure being an actual working pressure of the variator. In the first control mode, the actual speed ratio is calculated based on a detected value of a vehicle speed; and the speed change pump is controlled to cause the actual speed ratio to approach the target speed ratio. In the second control mode, the actual working pressure is detected and the speed change pump is controlled to cause the actual working pressure to approach a target working pressure corresponding to the target speed ratio. The first control mode is selected under a first condition in which the detected value of the vehicle speed is within an allowable range with respect to an actual vehicle speed and the second control mode is selected under a second condition in which the detected value of the vehicle speed is out of the allowable range.

In another aspect of the present invention, an automatic transmission control device is provided.

DESCRIPTION OF EMBODIMENTS

Hereinafter, embodiments of the present invention will be described with reference to the drawings.

(Configuration of Vehicle Drive System)

Figure 1:
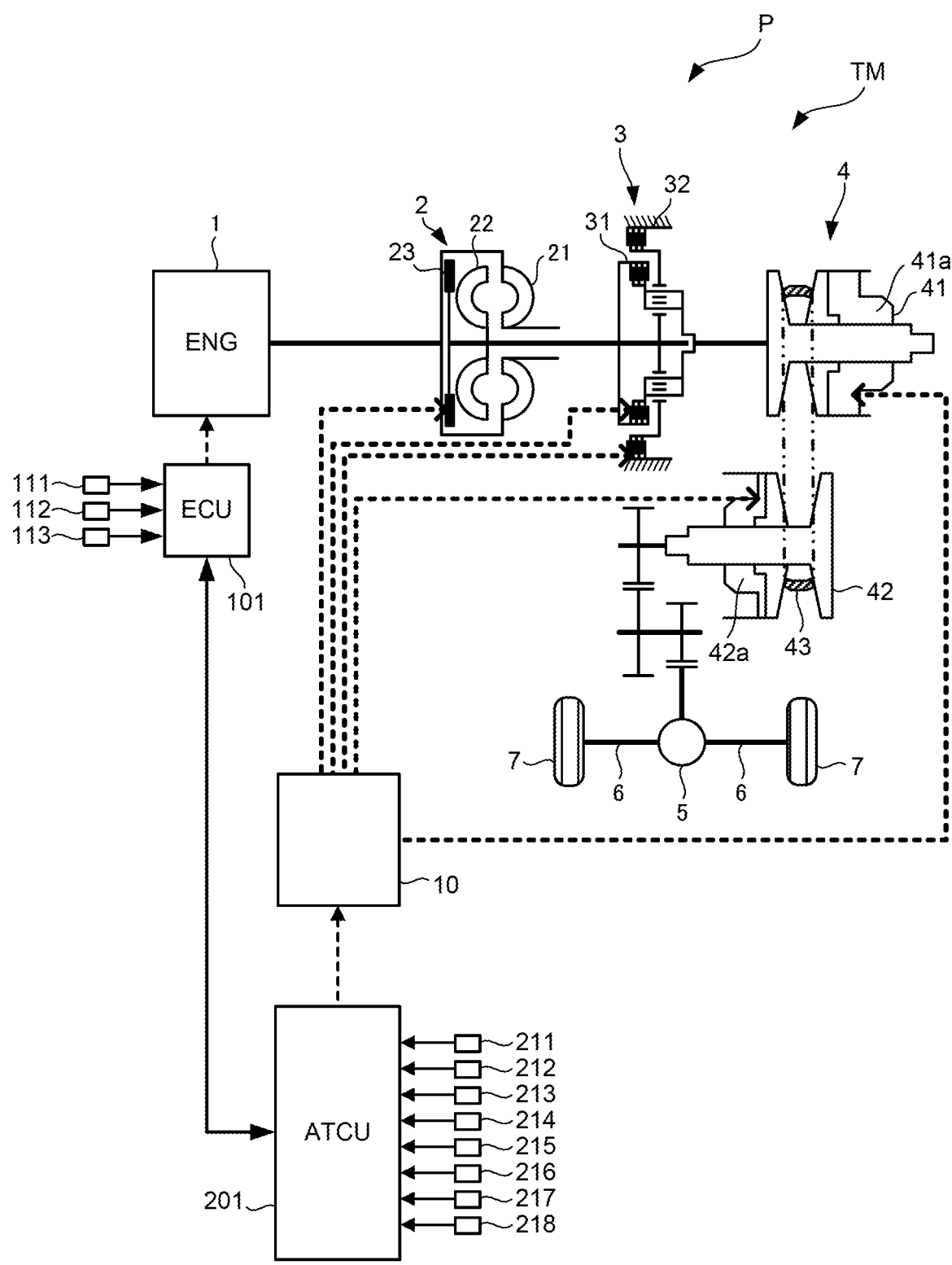
FIG. 1 is a schematic diagram illustrating the configuration of a vehicle drive system P including an automatic transmission TM according to one embodiment of the present invention.

FIG. 1 schematically illustrates the overall configuration of a vehicle drive system P including an automatic transmission TM according to one embodiment of the present invention.

The vehicle drive system P includes an internal combustion engine (hereinafter simply referred to as an "engine") 1 as a drive source and further includes a torque converter 2 and the automatic transmission TM in a power transmission path connecting the engine 1 and left and right drive wheels 7. In this embodiment, the automatic transmission TM is composed of a forward/reverse switching mechanism 3 and a variator 4, but can be configured to include as a part of it the torque converter 2. The automatic transmission TM converts, in a predetermined speed ratio, the rotational power input from the engine 1 via the torque converter 2 and outputs it to the drive wheels 7 via a differential gear 5.

The torque converter 2 includes a pump impeller 21 connected to an input shaft of the torque converter 2, and a turbine runner 22 connected to an output shaft of the torque converter 2, and transmits the input rotational power to the output shaft via the dynamic action of fluid. The torque converter 2 further includes a lockup clutch 23 connected to the output shaft. By engaging the lockup clutch 23, it is possible to directly connect the input shaft and the output shaft to thereby reduce the transmission loss due to fluid connection. Engagement and disengagement of the lockup clutch 23 can be switched by controlling the hydraulic pressure applied to the lockup clutch 23.

The forward/reverse switching mechanism 3 is disposed between the torque converter 2 and the variator 4 and switches the travel direction of the vehicle between forward and backward by switching the rotation direction of an output shaft relative to an input shaft of the forward/reverse switching mechanism 3 between the forward direction and the reverse direction. The forward/reverse switching mechanism 3 includes a forward clutch 31 that is engaged when the forward range is selected, and a reverse brake 32 that is engaged when the reverse range is selected. The vehicle moves forward in the state where the forward clutch 31 is engaged, and the vehicle moves backward in the state where the reverse brake 32 is engaged. Whether the forward range is selected or the reverse range is selected is determined based on the position of a shift lever (hereinafter may be referred to as the "shift position") operated by a driver. In the state where the forward clutch 31 and the reverse brake 32 are both disengaged, the automatic transmission TM is in the neutral state so that the transmission of the rotational power via the forward/reverse switching mechanism 3, i.e. the automatic transmission TM, is stopped. The operation of the forward/reverse switching mechanism 3 is controlled by adjusting the hydraulic pressure applied to the forward clutch 31 and the reverse brake 32.

The variator 4 includes a primary pulley 41 and a secondary pulley 42 and further includes a belt 43 wound between the pulleys 41, 42. By changing the ratio of the contact portion radii (hereinafter may be referred to as the "winding diameters") of the belt 43 around the primary pulley 41 and the secondary pulley 42, the variator 4 can change the speed ratio steplessly. The rotational power input to an input shaft of the variator 4 (a rotary shaft of the primary pulley 41 during the forward travel) is converted according to the speed ratio, and the rotational power after the conversion is output via an output shaft of the variator 4 (a rotary shaft of the secondary pulley 42). The speed ratio of the variator 4 is controlled by adjusting the hydraulic pressure applied to each of movable pulleys of the primary pulley 41 and the secondary pulley 42 to change the width of a V-groove formed between sheave surfaces of the movable pulley and a fixed pulley (hereinafter may be referred to as the "pulley groove width"). In this embodiment, a value obtained by dividing a rotation speed Npri of the primary pulley 41 by a rotation speed Nsec of the secondary pulley 42 per unit time (=Npri/Nsec) is defined as a speed ratio of the variator 4.

The rotational power output from the automatic transmission TM is transmitted to wheel axles 6 via a final gear train set to a predetermined gear ratio and the differential gear 5 and turns the drive wheels 7. In this embodiment, the wheel axle 6 forms a "drive shaft" of the vehicle.

Figure 2:
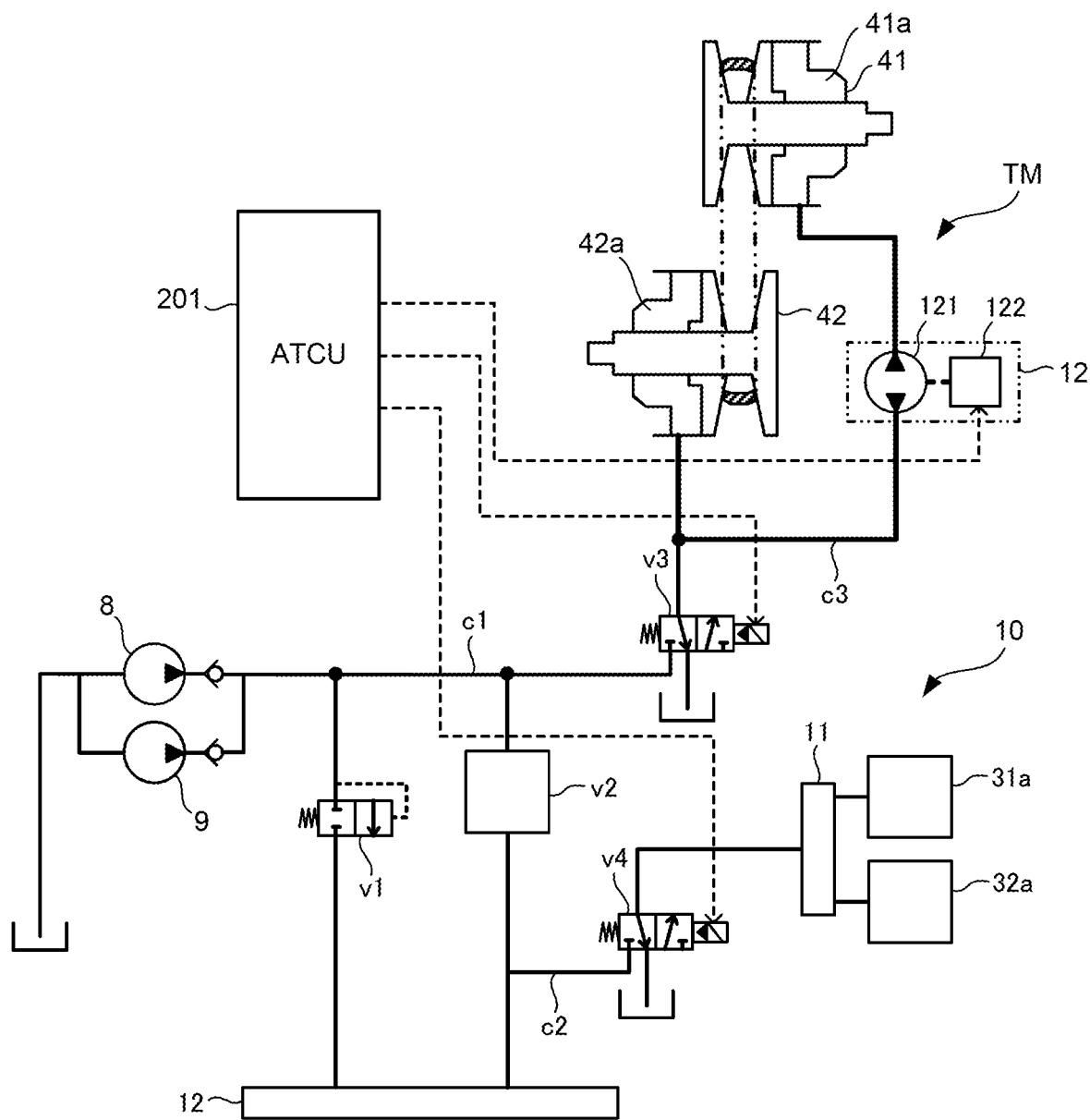
FIG. 2 is a schematic diagram illustrating the configuration of a hydraulic system included in the automatic transmission TM.

As illustrated in FIG. 2, in this embodiment, a mechanical oil pump 8 and an electric oil pump 9 are provided as a source for generating a hydraulic pressure that is applied to the lockup clutch 23 of the torque converter 2, the engaging elements (the forward clutch 31 and the reverse brake 32) of the forward/reverse switching mechanism 3, and the speed change elements (the primary pulley 41 and the secondary pulley 42) of the variator 4. The mechanical oil pump 8 and the electric oil pump 9 form a source pressure pump of the automatic transmission TM. The mechanical oil pump 8 is configured to be drivable by the rotational power transmitted along the power transmission path connecting the engine 1 and the drive wheels 7 and is driven by the output of the engine 1 or the power from the drive wheels 7 to increase the pressure of transmission oil or hydraulic oil stored in an oil pan of the automatic transmission TM to a predetermined pressure and to supply it to the respective portions via a hydraulic circuit 10. FIG. 1 schematically illustrates supply paths of the hydraulic oil to the respective portions via the hydraulic circuit 10 by dotted lines with arrows.

(Configuration and Basic Operation of Control System)

The operations of the engine 1 and the automatic transmission TM are respectively controlled by an engine controller 101 and a transmission controller 201. Each of the engine controller 101 and the transmission controller 201 is configured as an electronic control unit and composed of a microcomputer including a central processing unit (CPU), various storage devices such as a RAM and a ROM, an input/output interface, and so on.

The engine controller 101 receives detection signals of operating state sensors that detect an operating state of the engine 1, performs predetermined calculations based on the operating state, and sets a fuel injection amount, a fuel injection timing, and an ignition timing of the engine 1, and so on.

In this embodiment, as the operating state sensors, there are provided an accelerator sensor 111 that detects an operation amount of an accelerator pedal (hereinafter referred to as an "accelerator pedal opening") APO by the driver, a rotation speed sensor 112 that detects a rotation speed NE of the engine 1, a cooling water temperature sensor 113 that detects a temperature TW of engine cooling water, and so on, and there are further provided an air flow meter, a throttle sensor, a fuel pressure sensor, an air-fuel ratio sensor, and so on, which are not illustrated.

In relation to control of the automatic transmission TM, the transmission controller 201 receives detection signals from a vehicle speed sensor 211 that detects a travel speed of the vehicle (hereinafter referred to as a "vehicle speed") VSP, a brake sensor 212 that detects a brake pedal force BPF indicating a depression amount of a brake pedal by the driver, an input side rotation speed sensor 213 that detects a rotation speed (which refers to a rotation speed Npri per unit time) of the primary pulley 41, a primary pressure sensor 214 that detects a hydraulic pressure applied to the primary pulley 41 (which is a pressure in an oil chamber 41a and may hereinafter be referred to as a "primary pressure") Ppri, a secondary pressure sensor 215 that detects a hydraulic pressure applied to the secondary pulley 42 (which is a pressure in an oil chamber 42a and may hereinafter be referred to as a "secondary pressure") Psec, an oil temperature sensor 216 that detects a temperature of the hydraulic oil (hereinafter simply referred to as an "oil temperature") Toil of the automatic transmission TM, a shift position sensor 217 that detects a position SFT of the shift lever, and a motor speed sensor 218 that detects a rotation speed of a later-described speed change oil pump 12 (which is given by a rotation speed Nmtr of an electric motor 122 per unit time and may hereinafter be referred to as a "motor speed"). The motor speed Nmtr corresponds to the discharge amount of the speed change oil pump 12. In this embodiment, the vehicle speed sensor 211 is provided to be capable of measuring a state correlated to the rotation speed of the drive wheel 7, and the transmission controller 201 calculates the vehicle speed VSP based on the detection signal of the vehicle speed sensor 211. As a detection object of the vehicle speed sensor 211, there can be cited as an example the rotation speed of the wheel axle 6, i.e. the rotation speed of the drive shaft or the rotation speed of the drive wheel 7. Further, in this embodiment, the rotation speed of the secondary pulley 42 is detected by converting the detection value of the vehicle speed sensor 211 to the rotation speed Nsec of the secondary pulley 42 per unit time.

The transmission controller 201 is connected to the engine controller 101 via a CAN bus so as to be communicable with each other and receives information, such as the accelerator pedal opening APO, as the operating state of the engine 1 from the engine controller 101.

Then, the transmission controller 201 sets a target speed ratio of the automatic transmission TM (in this embodiment, the variator 4) based on the driving state of the vehicle, such as the accelerator pedal opening APO and the vehicle speed VSP, and controls the primary pressure Ppri and the secondary pressure Psec so that an actual speed ratio of the variator 4 approaches the target speed ratio. Specifically, the transmission controller 201 outputs control signals to various solenoids incorporated in the hydraulic circuit 10 and to the speed change oil pump 12 so that a predetermined differential pressure is applied across the primary pulley 41 and the secondary pulley 42 by using, as a source pressure, the hydraulic pressure generated by the mechanical oil pump 8, i.e. the discharge pressure of the mechanical oil pump 8.

(Configuration of Automatic Transmission)

FIG. 2 illustrates the configuration of the automatic transmission TM according to this embodiment, centering around the hydraulic system.

The automatic transmission TM includes the mechanical oil pump 8 and the electric oil pump 9 as the hydraulic source and further includes the hydraulic circuit 10 for distributing the hydraulic oil, discharged from the oil pumps 8, 9, to the respective portions being the supply destinations. The mechanical oil pump 8 and the electric oil pump 9 each pump up the transmission oil or the hydraulic oil from the oil pan and discharge it at a flow rate according to the rotation speed. The hydraulic circuit 10 includes a plurality of solenoid valves and a plurality of oil passages, adjusts the hydraulic pressure by using the discharge pressure of the oil pumps 8, 9 as a source pressure, and supplies the hydraulic oil to the respective portions at predetermined pressures.

The mechanical oil pump 8 is driven by the power supplied from the power transmission path connecting the engine 1 and the drive wheels 7 (FIG. 1) and supplies the hydraulic oil stored in the oil pan to a line pressure oil passage c1 of the hydraulic circuit 10. In this embodiment, pulleys are, respectively, coaxially attached to the pump impeller 21 of the torque converter 2 and coaxially mounted on an input shaft of the mechanical oil pump 8, and a belt is wound between those pulleys so that the power is transmitted to the mechanical oil pump 8 from the pump impeller 21 via the belt.

The electric oil pump 9 forms the hydraulic source of the automatic transmission TM jointly with the mechanical oil pump 8. In this embodiment, the electric oil pump 9 is provided for assisting the mechanical oil pump 8. For example, the electric oil pump 9 is driven to increase the line pressure of the hydraulic circuit 10 while the vehicle is stopped with the engine 1 not yet started even though the power is on by key-on, or the electric oil pump 9 is driven to maintain a predetermined line pressure during idle reduction of the engine 1.

As oil passages for allowing the hydraulic oil, to be supplied to the respective portions, to pass through, the hydraulic circuit 10 includes a plurality of oil passages, specifically, the line pressure oil passage c1, a clutch pressure oil passage c2, and a speed change pressure oil passage c3. Only three kinds of the oil passages c1 to c3 are illustrated by way of example for the sake of description, oil passages other than these passages may of course also be provided.

The hydraulic oil at a source pressure discharged from the oil pumps 8, 9 flows into the line pressure oil passage c1. A pressure regulating valve v1 is connected to the line pressure oil passage c1 so that the pressure in the line pressure oil passage c1 is adjusted to a predetermined line pressure by the pressure regulating valve v1. In the pressure regulating valve v1, the valve operating pressure or the valve opening pressure is set variable so that, for example, for optimizing a belt clamping force to be generated by the secondary pulley 42, it is possible to change the valve operating pressure according to the accelerator pedal opening APO to adjust the line pressure. Further, a pressure reducing valve v2 and a secondary pressure control valve v3 are connected to the line pressure oil passage c1 in parallel downstream of the pressure regulating valve v1. The secondary pressure control valve v3 is formed by a linear solenoid valve.

The hydraulic oil after pressure reduction by the pressure reducing valve v2 flows into the clutch pressure oil passage c2. The pressure in the clutch pressure oil passage c2 is adjusted by the pressure reducing valve v2 to a predetermined clutch pressure lower than the line pressure. A flow rate control valve v4 for forward/reverse switching is connected to the clutch pressure oil passage c2. The flow rate control valve v4 is formed by a linear solenoid valve.

A manual valve 11 that is operated in response to the shift lever switches an oil passage so that the hydraulic oil after control by the flow rate control valve v4 is supplied to the forward clutch 31 or the reverse brake 32 (hydraulic cylinders for driving the forward clutch 31 and the reverse brake 32 are denoted by symbols 31*a*, 32*a*). When the oil passage leading to the hydraulic cylinder 31*a* is set, the forward clutch 31 is engaged so that the vehicle is in a state of being movable forward, and when the oil passage leading to the hydraulic cylinder 32*a* is set, the reverse brake 32 is engaged so that the vehicle is in a state of being movable backward. On the other hand, in the state where communication between the clutch pressure oil passage c2 and the hydraulic cylinders 31*a*, 32*a* via the flow rate control valve v4 is blocked, the hydraulic oil is discharged from the hydraulic cylinders 31*a*, 32*a* to the oil pan, and accordingly, the forward brake 31 and the reverse brake 32 are both disengaged so that the automatic transmission TM is in the neutral state.

Part of the transmission oil having passed through the pressure regulating valve v1 and part of the transmission oil having passed through the pressure reducing valve v2 are supplied as the hydraulic oil of the lockup clutch 23 to the torque converter 2 via a low pressure circuit 12 and, further, supplied to a lubrication system and a cooling system of the automatic transmission TM.

The hydraulic oil after control by the secondary pressure control valve v3 flows into the speed change pressure oil passage c3. The speed change oil pump 12 is disposed in the speed change pressure oil passage c3 such that one end of the speed change pressure oil passage c3 on its one side with respect to the speed change oil pump 12 is connected to the oil chamber (hereinafter may be referred to as the "primary oil chamber") 41a of the primary pulley 41, and that the other end thereof is connected to the oil chamber (hereinafter may be referred to as the "secondary oil chamber") 42a of the secondary pulley 42. That is, the primary oil chamber 41a and the secondary oil chamber 42a communicate with each other via the speed change pressure oil passage c3 (and a pump chamber of the speed change oil pump 12), and it is possible to supply the hydraulic oil in the secondary oil chamber 42a to the primary oil chamber 41a through the speed change pressure oil passage c3, and to supply the hydraulic oil in the primary oil chamber 41a to the secondary oil chamber 42a through the speed change pressure oil passage c3. The speed change oil pump 12 forms a "speed change pump" according to this embodiment.

By moving the hydraulic oil in the secondary oil chamber 42a to the primary oil chamber 41a, the movable pulley approaches the fixed pulley in the primary pulley 41 so that the groove width of the primary pulley 41 is reduced, while the movable pulley moves away from the fixed pulley in the secondary pulley 42 so that the groove width of the secondary pulley 42 is increased. On the other hand, by moving the hydraulic oil in the primary oil chamber 41a to the secondary oil chamber 42a, the movable pulley moves away from the fixed pulley in the primary pulley 41 so that the groove width of the primary pulley 41 is increased, while the movable pulley approaches the fixed pulley in the secondary pulley 42 so that the groove width of the secondary pulley 42 is reduced. In this way, since the movement of the movable pulley in the secondary pulley 42 is interlocked with the change of the groove width or the winding diameter of the belt 43 caused by the movement of the movable pulley in the primary pulley 41, it is possible to adjust the speed ratio of the variator 4 by controlling the position of the movable pulley in the primary pulley 41, i.e. the stroke amount of the movable pulley in the primary pulley 41 (hereinafter may be referred to as the "primary pulley stroke amount").

The speed change oil pump 12 is formed by an electric pump and includes a pump body 121 forming the pump chamber, and the electric motor 122 being the power source. When the electric motor 122 is operated in response to a command signal from the transmission controller 201, a rotor provided in the pump body 121 is rotated. In this embodiment, the rotation direction and the rotation speed of the speed change oil pump 12 are adjustable. The rotation direction when moving the hydraulic oil from the secondary oil chamber 42a to the primary oil chamber 41a is defined as the forward rotation direction of the speed change oil pump 12, and the rotation direction when moving the hydraulic oil from the primary oil chamber 41a to the secondary oil chamber 42a is defined as the reverse rotation direction of the speed change oil pump 12. When the secondary pressure Psec is increased or reduced beyond a predetermined range due to the movement of the hydraulic oil, it is possible to operate the secondary pressure control valve v3 to discharge the excess of the hydraulic oil from the speed change pressure oil passage c3 to the oil pan or to supply the shortage of the hydraulic oil from the line pressure oil passage c1 to the speed change pressure oil passage c3.

As a result of the operation of the speed change oil pump 12, the primary pressure Ppri is formed in the primary oil chamber 41a so that a predetermined pulley thrust force acts on the movable pulley of the primary pulley 41, while the secondary pressure Psec is formed in the secondary oil chamber 42a so that a predetermined pulley thrust force acts on the movable pulley of the secondary pulley 42. Herein, a "pulley thrust force" is obtained by multiplying a pressure of the pulley oil chamber 41a, 42a by an effective area of a pressure receiving surface formed on the target movable pulley.

In this embodiment, a target speed ratio Rtrg of the variator 4 is set according to the driving state of the vehicle, and the ratio of the winding diameters of the belt 43 in the primary pulley 41 and the secondary pulley 42, i.e. the position of the movable pulley in the primary pulley 41 and the position of the movable pulley in the secondary pulley 42, are controlled so that a speed ratio R of the variator 4 approaches the target speed ratio Rtrg. As already described, the positions or movements of the movable pulleys are correlated between the primary pulley 41 and the secondary pulley 42, and therefore, in this embodiment, basically, the stroke amount of the primary pulley 41 is used as a control parameter.

(Content of Speed Change Control)

Hereinafter, referring to FIGS. 3 to 5, the content of control performed by the transmission controller 201 according to this embodiment will be described.

Figure 3:
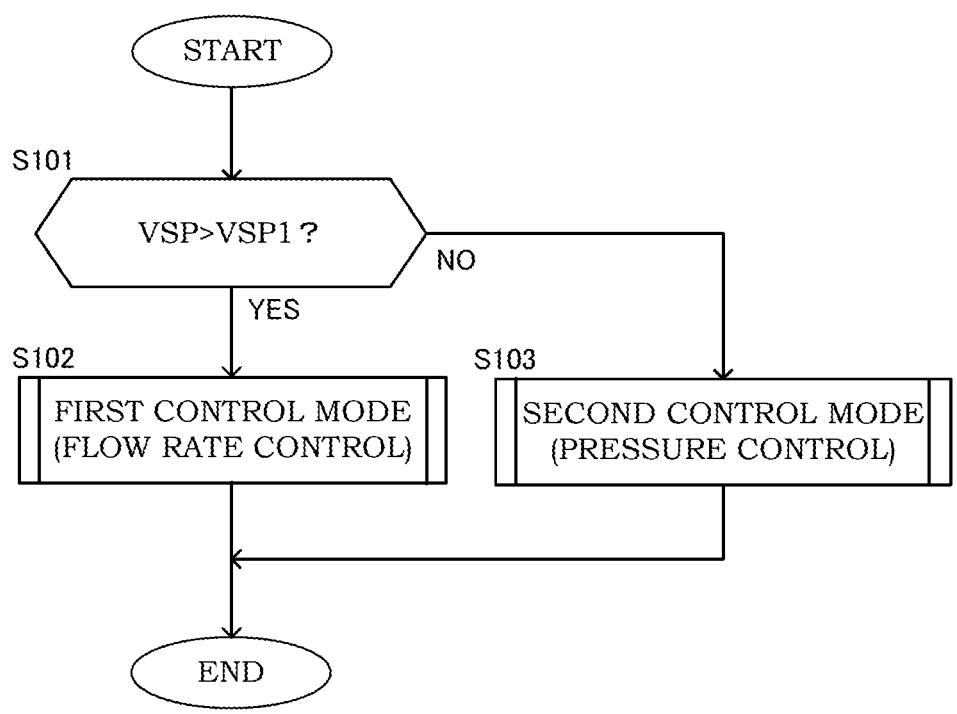
FIG. 3 is a flowchart illustrating the basic flow of speed change control according to the one embodiment of the present invention.
Figure 4:
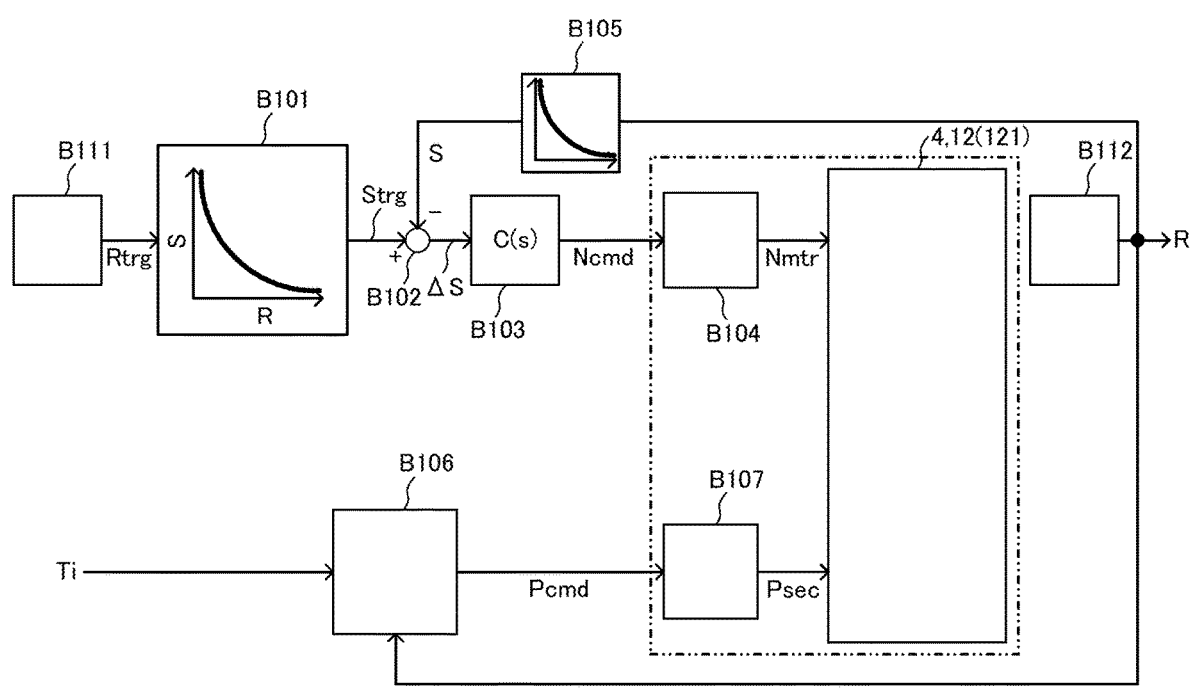
FIG. 4 is a schematic diagram illustrating the configuration of a control system according to a first control mode of the speed change control.
Figure 5:
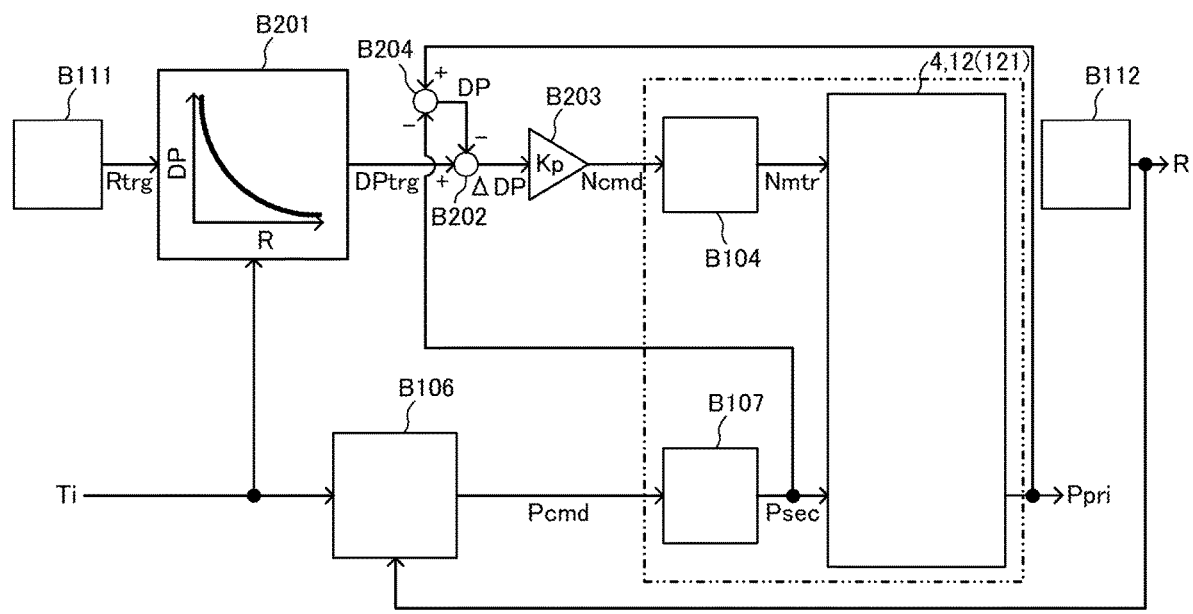
FIG. 5 is a schematic diagram illustrating the configuration of a control system according to a second control mode of the speed change control.

FIG. 3 illustrates the basic flow of speed change control according to this embodiment by a flowchart, and FIG. 4 and FIG. 5 respectively illustrate, by functional blocks, the configuration of a control system according to a first control mode of the speed change control and the configuration of a control system according to a second control mode of the speed change control. In FIG. 5, portions that perform the same calculations or operations as in the first control mode are given the same symbols as in FIG. 4.

In this embodiment, the transmission controller 201 is programmed to perform the control illustrated by the flowchart in FIG. 3 at a predetermined calculation cycle.

In this embodiment, by using the stroke amount of the primary pulley 41 as a control parameter, the rotation direction and the rotation speed (motor speed Nmtr) of the speed change oil pump 12 are controlled so that an actual stroke amount approaches a target stroke amount corresponding to a target speed ratio of the variator 4. As the stroke amount, it is possible to exemplify an amount of movement of the movable pulley from a position where the movable pulley is the farthest from the fixed pulley, i.e. a position where the pulley groove width becomes the maximum. Herein, in order to grasp the actual stroke amount, an actual speed ratio of the variator 4 is detected as feedback information, and calculation is performed to convert the actual speed ratio to the stroke amount. The speed ratio is detected by calculating a rotation speed Nsec of the secondary pulley 42 from a detection value of the vehicle speed sensor 211 and dividing a rotation speed Npri of the primary pulley 41 by the rotation speed Nsec of the secondary pulley 42. However, because of the characteristics of the vehicle speed sensor 211, its vehicle speed detection accuracy decreases in an extremely low rotation speed range, and therefore, it is difficult to stably perform the control of the speed change oil pump 12 using the stroke amount in the extremely low vehicle speed range.

Accordingly, in this embodiment, the control mode is switched for the extremely low vehicle speed range where the detection accuracy of the vehicle speed sensor 211 decreases beyond the allowable range for control, and for the other range. In the range other than the extremely low vehicle speed range, the first control mode is selected in which an actual speed ratio of the variator 4 is used as feedback information, and in the extremely low vehicle speed range, the second control mode is selected in which an actual working pressure applied to the variator 4 is used as feedback information. By controlling the difference or the ratio between the primary pressure Ppri and the secondary pressure Psec, it is possible to adjust the pulley thrust force in the primary pulley 41 and the pulley thrust force in the secondary pulley 42 to change the speed ratio of the variator 4. In this embodiment, since the relative pressure of the primary pressure Ppri to the secondary pressure Psec exerts a substantial influence on the operation of the variator 4, i.e. the change in the winding diameters of the belt 43, a difference obtained by subtracting the secondary pressure Psec from the primary pressure Ppri (hereinafter referred to as a "differential pressure") DP is employed as a "working pressure of the variator". Instead of the differential pressure DP, a ratio between the primary pressure Ppri and the secondary pressure Psec, for example, a value obtained by dividing the primary pressure Ppri by the secondary pressure Psec (=Ppri/Psec), may be defined as a relative pressure of the variator 4 and employed as a working pressure.

In the flowchart illustrated in FIG. 3, at S101, it is determined whether or not a vehicle speed VSP is higher than a predetermined vehicle speed VSP1 indicating an upper limit of the extremely low vehicle speed range. When the vehicle speed VSP is higher than the predetermined vehicle speed VSP1, it is determined that the vehicle speed VSP is in the range other than the extremely low vehicle speed range, and the control proceeds to S102. When the vehicle speed VSP is equal to or less than the predetermined vehicle speed VSP1, it is determined that the vehicle speed VSP is in the extremely low vehicle speed range, and the control proceeds to S103.

At S102, the control mode is set to the first control mode.

At S103, the control mode is set to the second control mode.

In the first control mode (FIG. 4), the stroke amount of the primary pulley 41 is used as a control parameter. A target speed ratio Rtrg of the variator 4 is calculated based on, for example, an accelerator pedal opening APO and a vehicle speed VSP as the driving state of the vehicle (target speed ratio calculation unit B111), and the target speed ratio Rtrg is converted to a target stroke amount Strg of the primary pulley 41 (target stroke amount calculation unit B101). Table data defining the relationship between the speed ratio R and the stroke amount S is produced and stored in advance in the transmission controller 201, and the target stroke amount Strg is calculated by retrieving the table data with the target speed ratio Rtrg at the time of actual speed change control.

A deviation ΔS (=Strg−S) between the target stroke amount Strg and an actual stroke amount of the primary pulley 41 (hereinafter referred to as an "actual stroke amount") S is calculated (subtraction unit B102), and a command value of the rotation speed of the speed change oil pump 12 (motor speed command value Ncmd) is calculated based on the deviation ΔS of the stroke amount (feedback compensation unit B103). For example, the motor speed command value Ncmd is calculated as a rotation speed per minute by the following formulas. The following formulas set a volume of the hydraulic oil, i.e. a flow rate of the hydraulic oil, that is delivered per minute to the primary oil chamber 41a or the secondary oil chamber 42a by the speed change oil pump 12. In this sense, the first control mode is a control mode that controls the flow rate of the hydraulic oil.

$$\mathrm{Ncmd} = C(s) \times \Delta S \quad (1.1)$$

$$C(s) = (60 \times A_{PRI}/\mathrm{Disp}) \times K_P \quad (1.2)$$

Herein, $A_{PRI}$ represents an effective area of a pressure receiving surface formed in the primary oil chamber 41a, and Disp represents a discharge amount of the speed change oil pump 12 per rotation. Further, $K_P$ represents a proportional gain.

The motor speed command value Ncmd is input to a motor speed control system B104. Consequently, the speed change oil pump 12 is rotated at a speed (motor speed Nmtr) according to the motor speed command value Ncmd to move the hydraulic oil from the secondary oil chamber 42a to the primary oil chamber 41a or from the primary oil chamber 41a to the secondary oil chamber 42a according to the positive or negative sign of the deviation ΔS of the stroke amount. Herein, the speed change oil pump 12 is rotated in the forward rotation direction when the deviation ΔS has a positive value, and the speed change oil pump 12 is rotated in the reverse rotation direction when the deviation ΔS has a negative value. In this embodiment, the motor speed control system B104 includes the electric motor 122 of the speed change oil pump 12, the motor speed sensor 218, and a non-illustrated inverter.

An actual speed ratio of the variator 4 (hereinafter referred to as an "actual speed ratio") R is calculated by dividing a rotation speed Npri of the primary pulley 41 by a rotation speed Nsec of the secondary pulley 42 (actual speed ratio calculation unit B112), and the actual speed ratio R is converted to an actual stroke amount of the primary pulley 41 (hereinafter referred to as an "actual stroke amount") S (actual stroke amount calculation unit B105). The actual stroke amount can be calculated by table data having a trend similar to that used for conversion from the target speed ratio Rtrg to the target stroke amount Strg.

On the other hand, a minimum pressure of the hydraulic oil in the speed change pressure oil passage c3 is calculated based on an input torque Ti to the variator 4 and the actual speed ratio R (secondary pressure calculation unit B106). The minimum pressure of the speed change pressure oil passage c3 is correlated with a belt clamping force to be generated by the secondary pulley 42, and by adjusting the minimum pressure according to the input torque Ti and so on, it is possible to allow the secondary pulley 42 to generate a proper belt clamping force. The input torque Ti to the variator 4 can be calculated by multiplying an output torque of the engine 1 by a transmission efficiency η of the torque converter 2. The target speed ratio Rtrg may be used instead of the actual speed ratio R for calculating the minimum pressure.

The minimum pressure of the speed change pressure oil passage c3 is input as a secondary pressure command value Pcmd to a secondary pressure control system B107. Consequently, the secondary pressure control valve v3 is operated according to the relationship between the secondary pressure command value Pcmd and an actual value (actual secondary pressure Psec) to maintain the actual secondary pressure Psec at the secondary pressure command value Pcmd (i.e. the minimum pressure according to the input torque Ti and so on). Specifically, when the actual secondary pressure Psec is lower than the secondary pressure command value Pcmd, the secondary pressure control valve v3 moves the hydraulic oil in the line pressure oil passage c1 to the speed change pressure oil passage c3 to increase the secondary pressure Psec, and when the actual secondary pressure Psec is higher than the secondary pressure command value Pcmd, the secondary pressure control valve v3 discharges the hydraulic oil in the speed change pressure oil passage c3 to the oil pan to reduce the secondary pressure Psec. In this embodiment, the secondary pressure control system B107 includes the secondary pressure control valve v3 and the secondary pressure sensor 215.

In the second control mode (FIG. 5), the control parameter is switched from the stroke amount S of the primary pulley 41 to a relative pressure, specifically, a differential pressure DP (=Ppri−Psec) between the primary pressure Ppri and the secondary pressure Psec, and a target speed ratio Rtrg of the variator 4 calculated based on the driving state of the vehicle is converted to a target value of the differential pressure DP (hereinafter referred to as a "target differential pressure") DPtrg (target differential pressure calculation unit B201). In this embodiment, the target differential pressure DPtrg is calculated based on the target speed ratio Rtrg and an actual input torque Ti to the variator 4. Map data defining the relationship between the speed ratio R, the input torque Ti, and the differential pressure DP is produced and stored in advance in the transmission controller 201, and the target differential pressure DPtrg is calculated by retrieving the map data with the target speed ratio Rtrg and the actual input torque Ti at the time of actual speed change control.

A deviation ΔDP (=DPtrg−DP) between the target differential pressure DPtrg and an actual differential pressure (hereinafter referred to as an "actual differential pressure") DP is calculated (subtraction unit B202), and a motor speed command value Ncmd is calculated based on the deviation ΔDP of the differential pressure (feedback compensation unit B203). For example, the motor speed command value Ncmd is calculated by multiplying the deviation ΔDP by a proportional gain $K_P$. Then, the motor speed command value Ncmd is input to a motor speed control system B104 formed by the electric motor 122 and so on so that the speed change oil pump 12 is rotated at a speed according to the motor speed command value Ncmd. The actual differential pressure DP is calculated by subtracting an actual secondary pressure Psec detected by the secondary pressure sensor 215 from an actual primary pressure Ppri detected by the primary pressure sensor 214 (subtraction unit B204). The actual differential pressure DP can be detected by not only the individual pressure sensors 214, 215 and the subtraction unit B204, but also a differential pressure sensor. In this way, the second control mode controls the relative pressure between the primary pressure Pri and the secondary pressure Psec through the control of the speed change oil pump 12, and in this sense, the second control mode is a control mode that controls the working pressure.

Figure 6:
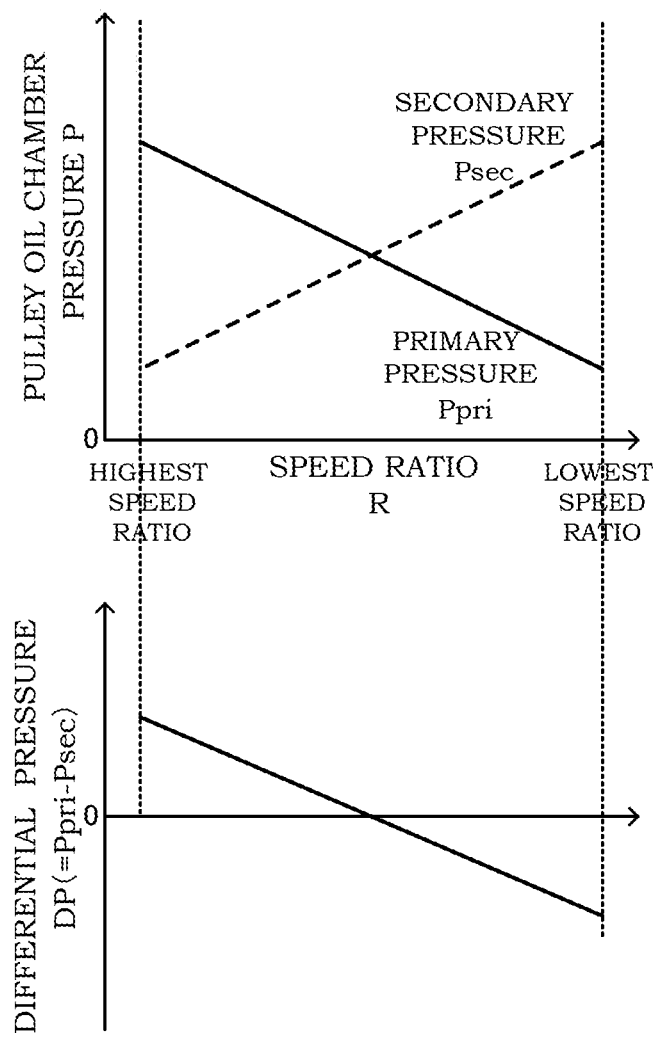
FIG. 6 is an explanatory diagram illustrating the relationship between the pulley oil chamber pressure (and the differential pressure) and the speed ratio when the input torque to a variator is zero.
Figure 7:
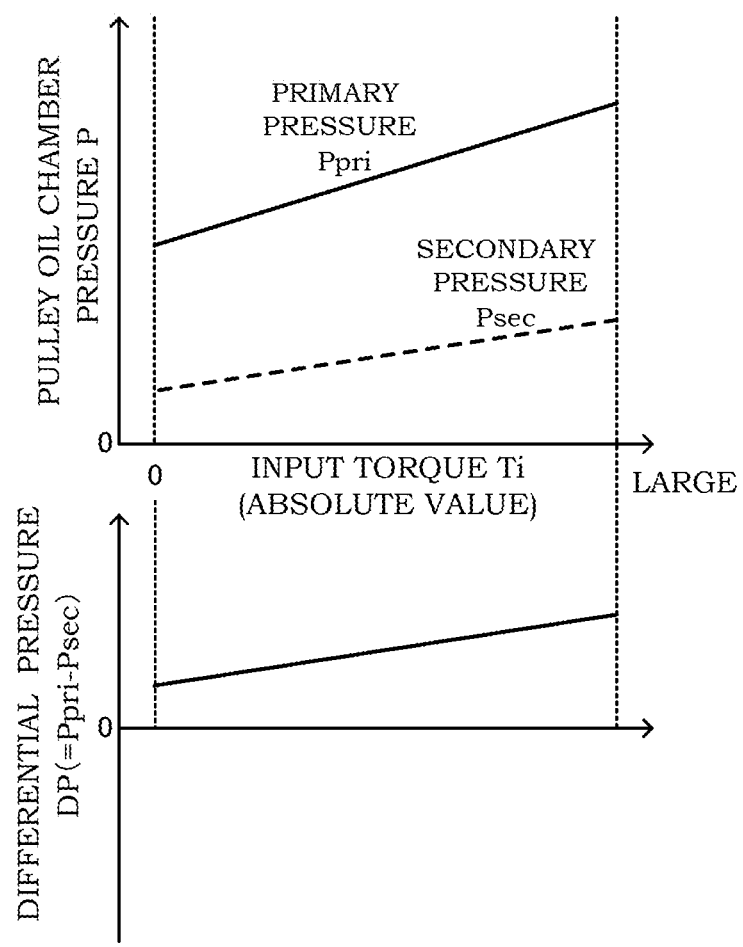
FIG. 7 is an explanatory diagram illustrating the relationship between the pulley oil chamber pressure (and the differential pressure) and the input torque in the speed ratio on the highest speed side.
Figure 8:
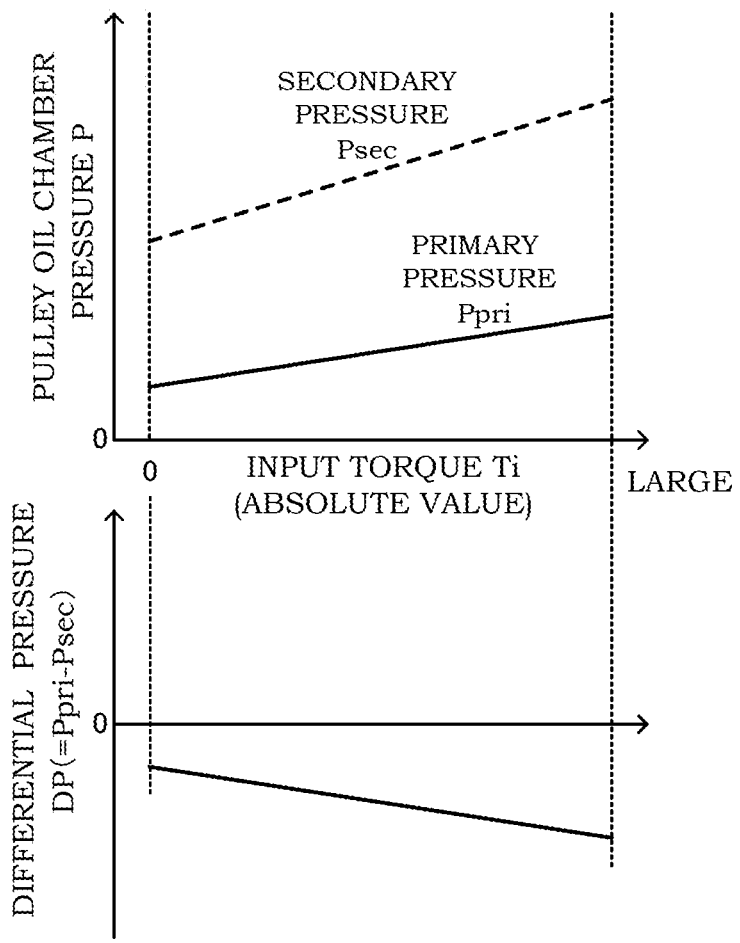
FIG. 8 is an explanatory diagram illustrating the relationship between the pulley oil chamber pressure (and the differential pressure) and the input torque in the speed ratio on the lowest speed side.

FIGS. 6 to 8 each illustrate the relationship between the input torque Ti to the variator 4 or the speed ratio R and the pulley oil chamber pressure P (primary pressure Ppri, secondary pressure Psec) in the upper row, and the differential pressure DP (=Ppri−Psec) converted from the pulley oil chamber pressure P in the lower row. Referring to these figures, the setting of the minimum pressure of the speed change pressure oil passage c3 (secondary pressure command value Pcmd) and the target differential pressure DPtrg will be further described.

FIG. 6 illustrates the relationship between the pulley oil chamber pressure P (and the differential pressure DP) and the speed ratio R when the input torque Ti to the variator 4 is zero. When the input torque Ti is zero, as the speed ratio increases (i.e. as the shift stage approaches the lowest speed stage), the primary pressure Ppri is reduced to increase the groove width of the primary pulley 41, while the secondary pressure Psec is increased to reduce the groove width of the secondary pulley 42. Consequently, when the input torque Ti is zero, the minimum pressure of the speed change pressure oil passage v3 is set with a trend to increase as the variator 4 is more on the low speed stage side. On the other hand, the target differential pressure DPtrg is set with a trend to increase in the negative direction as the variator 4 is more on the low speed stage side, and to increase in the positive direction as the variator 4 is more on the high speed stage side, given that a point where the primary pressure Ppri and the secondary pressure Psec are equal to each other is zero.

FIG. 7 illustrates the relationship between the pulley oil chamber pressure P (and the differential pressure DP) and the input torque Ti in the speed ratio on the highest speed side (so-called the highest speed ratio). In the highest speed ratio, as the input torque Ti (specifically, the absolute value of the input torque) increases, the primary pressure Ppri is increased and the secondary pressure Psec is also increased. Note, however, that the primary pressure Ppri is set to be greater than the secondary pressure Psec and set to a slope greater than that of the secondary pressure Psec. Consequently, in the highest speed ratio, the minimum pressure of the speed change pressure oil passage v3 and the target differential pressure DPtrg are each set with a trend to increase as the input torque Ti increases.

FIG. 8 illustrates the relationship between the pulley oil chamber pressure P (and the differential pressure DP) and the input torque Ti in the speed ratio on the lowest speed side (so-called the lowest speed ratio). In the lowest speed ratio, as the input torque Ti increases, the primary pressure Ppri and the secondary pressure Psec are both increased. However, in contrast to the case of the highest speed ratio, the secondary pressure Psec is set to be greater than the primary pressure Ppri and set to a slope greater than that of the primary pressure Ppri. Consequently, in the lowest speed ratio, the minimum pressure of the speed change pressure oil passage v3 is set with a trend to increase as the input torque Ti increases, while the target differential pressure DPtrg has a negative value and is set with a trend to increase in the negative direction as the input torque Ti increases.

In this embodiment, an "automatic transmission control device" is formed by the speed change oil pump 12 and the transmission controller 201. As described earlier, a "speed change pump" is formed by the speed change oil pump 12, and a "controller" is formed by the transmission controller 201. The function of a "target speed ratio setting unit" is realized by the target speed ratio calculation unit B111, the function of an "actual speed ratio calculation unit" is realized by the actual speed ratio calculation unit B112, the function of an "actual working pressure detection unit" is realized by the subtraction unit B204, and the function of a "speed change pump control unit" is realized by the entirety of the functional blocks illustrated in FIG. 4 excluding the target speed ratio calculation unit B111 and the actual speed ratio calculation unit B112, the target differential pressure calculation unit B201, the subtraction unit B202, and the feedback compensation unit B203.

(Description of Operations and Effects)

The automatic transmission TM according to this embodiment is configured as described above, and the effects obtained by this embodiment will be described below.

First, in this embodiment, the control mode is switched for the extremely low vehicle speed range where the detection accuracy of the vehicle speed sensor 211 decreases beyond the allowable range for control, and for the other range, and the speed change oil pump 12 is controlled, in the range other than the extremely low vehicle speed range, by the first control mode in which the speed ratio (actual speed ratio) R of the variator 4 is used as feedback information, and is controlled, in the extremely low vehicle speed range, by the second control mode in which the differential pressure (actual differential pressure) DP between the primary pressure Ppri and the secondary pressure Psec is used as feedback information. Consequently, it is possible to allow the speed ratio R of the variator 4 to stably follow the target speed ratio Rtrg, not relying on the vehicle speed VSP, i.e. not only under a condition in which the detected value VSP of the vehicle speed is within the allowable range with respect to the actual vehicle speed, but also under a condition in which it is out of the allowable range. Herein, the vehicle speed VSP being higher than the predetermined vehicle speed VSP1 and thus being in the range other than the extremely low vehicle speed range corresponds to a "first condition", and the vehicle speed VSP being in the extremely low vehicle speed range corresponds to a "second condition".

Figure 9:
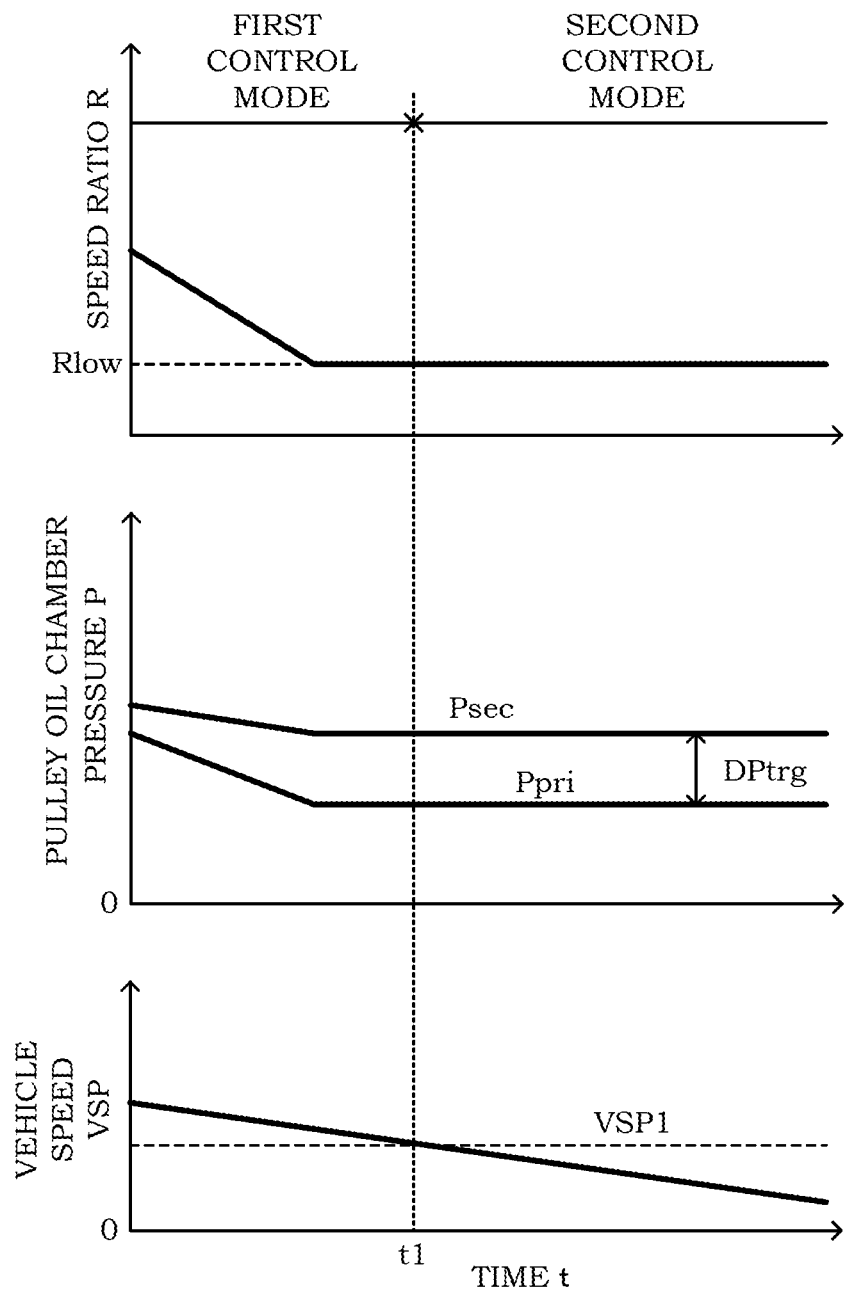
FIG. 9 is an explanatory diagram illustrating the changes of the pulley oil chamber pressure and the speed ratio when switching the control mode from the first control mode to the second control mode according to the one embodiment of the present invention.
Figure 10:
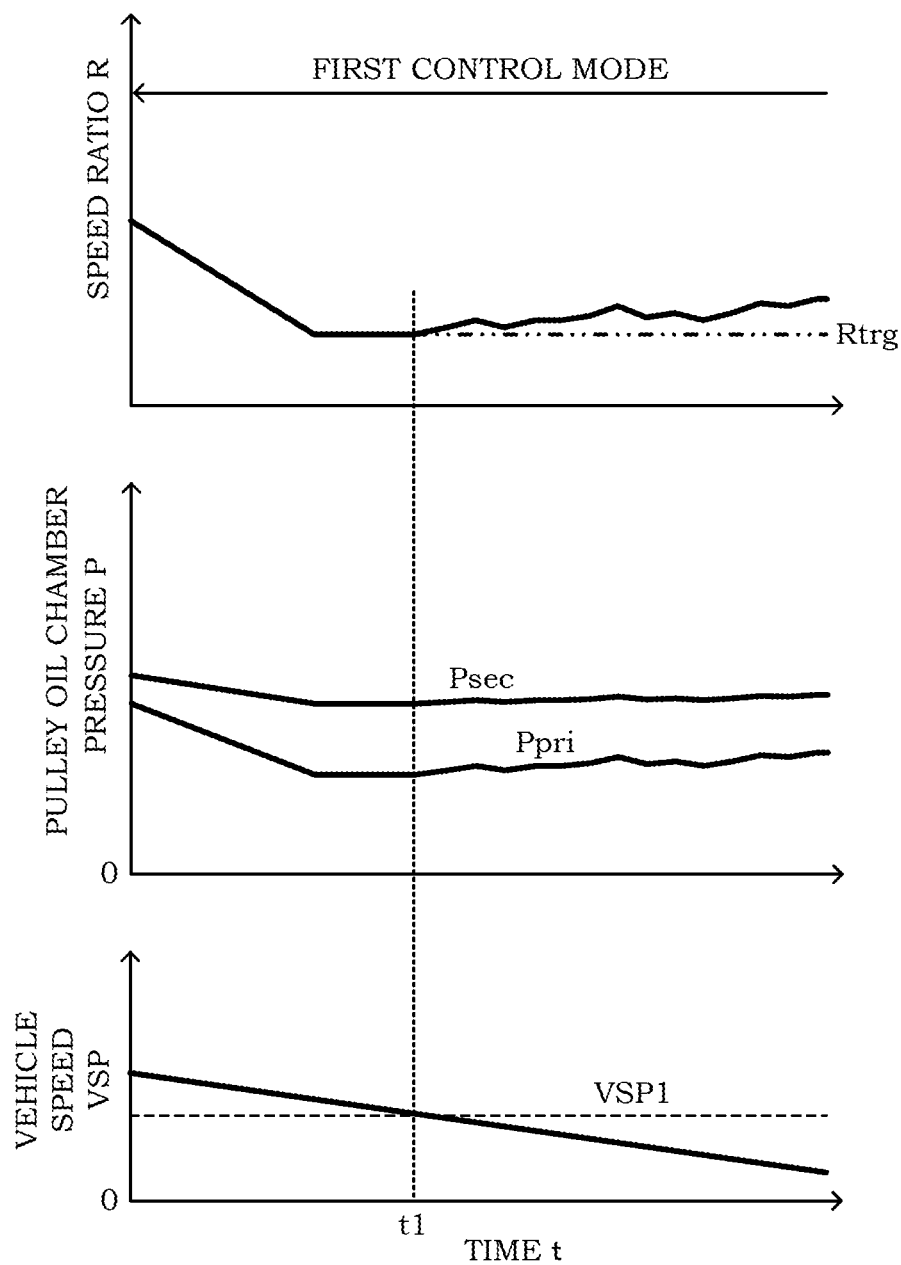
FIG. 10 is an explanatory diagram illustrating the changes of the pulley oil chamber pressure and the speed ratio in the case of only the first control mode as a comparative example.

FIGS. 9 and 10 each illustrate the changes of the speed ratio R, the pulley oil chamber pressure P, and the vehicle speed VSP during deceleration running, wherein FIG. 9 illustrates the changes when switching the control mode from the first control mode to the second control mode according to this embodiment, and FIG. 10 illustrates the changes in the case of only the first control mode as a comparative example.

In the case of only the first control mode, in the extremely low vehicle speed range where the detection accuracy of the vehicle speed VSP by the vehicle speed sensor 211 decreases, the operation of the feedback compensation unit B103 is not stable due to the fluctuation of the actual speed ratio R (=Npri/Nsec) so that it is difficult to cause the speed ratio R of the variator 4 to follow the target speed ratio Rtrg. FIG. 10 illustrates the state in which, in the extremely low vehicle speed range where the vehicle speed VSP is equal to or less than the predetermined value VSP1 (at time t1 and thereafter), the primary pressure Ppri is not stable due to the unstable operation of the feedback compensation unit B103, leading to the occurrence of fluctuation in the speed ratio R of the variator 4. Relatively small fluctuation that appears in the secondary pressure Psec is caused by the propagation of the fluctuation of the primary pressure Ppri.

In contrast to this, by switching the control mode from the first control mode to the second control mode in the extremely low vehicle speed range to switch the feedback information from the speed ratio R of the variator 4 to the differential pressure DP between the primary pressure Ppri and the secondary pressure Psec, it is possible to stabilize the operation of the feedback compensation unit B203 without relying on the vehicle speed VSP and thus to allow the speed ratio R of the variator 4 to follow the target speed ratio Rtrg ranging to a lower vehicle speed equal to or less than the predetermined value VSP1. Herein, when the target speed ratio Rtrg is the speed ratio on the lowest speed side (the lowest speed ratio) Rlow of the automatic transmission TM, the lowest speed ratio Rlow can be reliably achieved by setting the target differential pressure DPtrg to a predetermined pressure smaller than a differential pressure (upper limit pressure) that is minimally required for achieving the target speed ratio Rtrg.

According to this embodiment, for the automatic transmission TM in which the primary oil chamber 41a and the secondary oil chamber 42a communicate with each other via the speed change pressure oil passage c3, and the speed change oil pump 12 is disposed in the speed change pressure oil passage c3, it is possible to stabilize the speed change control in the extremely low vehicle speed range to achieve the target speed ratio Rtrg.

Second, in the second control mode, by using the differential pressure DP between the primary pressure Ppri and the secondary pressure Psec as the control parameter and controlling the speed change oil pump 12 based on the actual differential pressure DP being the actual differential pressure therebetween, when the pressure is changed in one of the oil chambers (e.g. the secondary oil chamber 42a), it is possible to eliminate the need to compensate for a change in pressure that occurs in the other oil chamber (the primary oil chamber 41a) due to the change in pressure in the secondary oil chamber 42a, thereby making it possible to simplify the control. For example, when the pressure (minimum pressure) of the speed change pressure oil passage c3 is increased for increasing the belt clamping force, since a constant value is maintained in the case of the differential pressure DP, it is possible to eliminate the need to compensate for a change of the primary pressure Ppri caused by the increase of the minimum pressure.

In the above description, the differential pressure DP between the primary pressure Ppri and the secondary pressure Psec is employed as the working pressure of the variator 4, but alternatively, it is possible to employ the primary pressure Pri.

Figure 11:
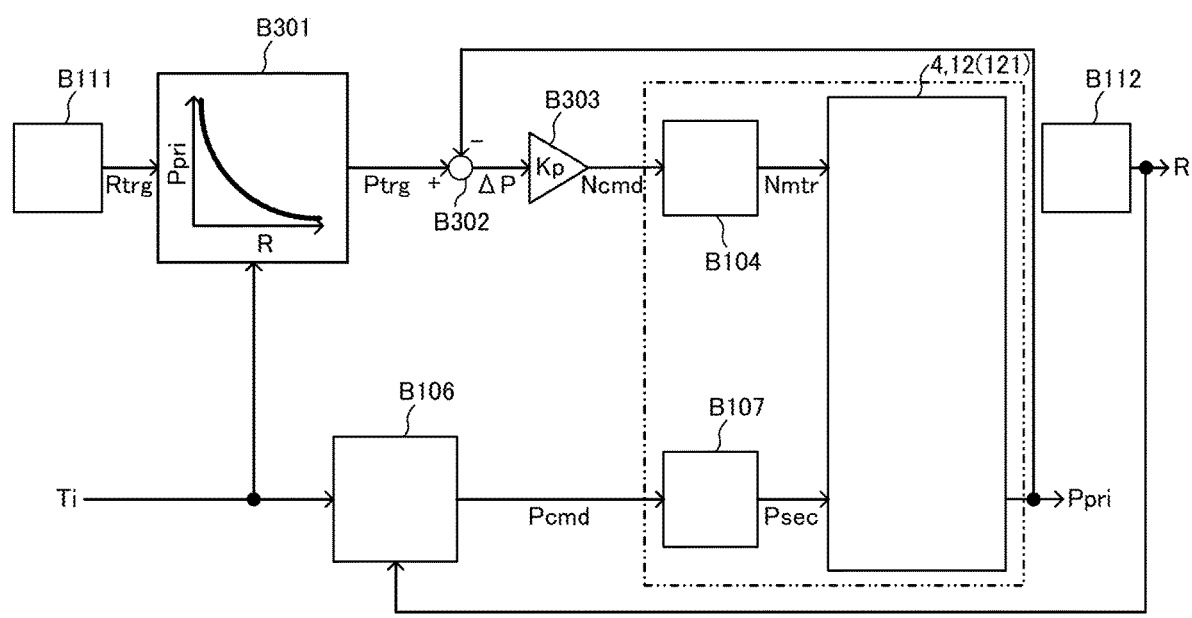
FIG. 11 is a schematic diagram illustrating the configuration of a control system according to a second control mode of speed change control according to another embodiment of the present invention.

FIG. 11 illustrates the configuration of a control system according to a second control mode of speed change control according to another embodiment of the present invention. In the figure, portions that perform the same calculations or operations as in a first control mode are given the same symbols as in FIG. 4. In this embodiment, a control system according to the first control mode can be configured in the same way as in the previous embodiment (FIG. 4).

In this embodiment, in the second control mode, a target speed ratio Rtrg of the variator 4 is converted to a target value of a primary pressure Ppri (hereinafter referred to as a "target primary pressure") Ptrg (target primary pressure calculation unit B301). The target primary pressure Ptrg is calculated by retrieving map data having the trends illustrated in FIGS. 6 to 8 with the target speed ratio Rtrg and an actual input torque Ti to the variator 4. A deviation $\Delta P$ (=Ptrg−Ppri) between the target primary pressure Ptrg and an actual primary pressure (hereinafter referred to as an "actual primary pressure") Ppri is calculated (subtraction unit B302), and a motor speed command value Ncmd is calculated by multiplying the deviation $\Delta P$ of the primary pressure by a proportional gain $K_P$ (feedback compensation unit B303). Then, the motor speed command value Ncmd is input to a motor speed control system B104 formed by the electric motor 122 and so on so that the speed change oil pump 12 is rotated at a speed according to the motor speed command value Ncmd.

In this way, by using the primary pressure Ppri as feedback information instead of the differential pressure DP, it is also possible to stabilize the operation of the feedback compensation unit B303 in the extremely low vehicle speed range to achieve the target speed ratio Rtrg.

In this embodiment, the function of a "speed change pump control unit" (the control system according to the second control mode) is realized by the target primary pressure calculation unit B301, the subtraction unit B302, and the feedback compensation unit B303 of the functional blocks illustrated in FIG. 11.

In the above description, in the second control mode, the speed ratio R of the variator 4 is controlled by using the pressure (the primary pressure Ppri or the differential pressure DP being the relative pressure), but it is also possible to control it by using a pulley thrust force. In this case, a target value of the pulley thrust force corresponding to the target speed ratio Rtrg is set, and an actual pulley thrust force is detected by multiplying a pulley oil chamber pressure by the effective area of the pressure receiving surface. Since, like the differential pressure DP or the like, the pulley thrust force also exerts a substantial influence on the change in the winding diameters of the belt 43, the pulley thrust force is included in the concept of the pressure in this invention. That is, the relative value (e.g. the difference or the ratio) between the pulley thrust force in the primary pulley 41 and the pulley thrust force in the secondary pulley 42 is defined as one aspect of a "working pressure of the variator".

In the second control mode, when controlling the speed change oil pump 12, the torque of the electric motor 122 may be controlled instead of the motor speed Nmtr. Since there is a proportional relationship between the differential pressure of the pulley oil chambers and the motor torque or the motor current value, the construction of the control system, particularly the feedback compensation unit, is facilitated.

As the second condition for selecting the second control mode, other than the condition caused by the characteristics of the vehicle speed sensor (being in the extremely low vehicle speed range), it is possible to exemplify (a) traveling on a bad road (rough road) or (b) failure of the vehicle speed sensor. By switching the control mode from the first control mode to the second control mode under such a situation, it is also possible to stabilize the operation of the feedback compensation unit to achieve the target speed ratio Rtrg.

Further, an automatic transmission to which the present invention is applied may include the variator 4 as a main transmission mechanism and, instead of the forward/reverse switching mechanism 3, a sub-transmission mechanism downstream of the variator 4, i.e. closer to the drive wheels 7 than the variator 4.

While the embodiments of the present invention have been described above, the above-described embodiments only show part of application examples of the present invention and are not intended to limit the technical scope of the present invention to the specific configurations of the above-described embodiments.

This application claims priority to Patent Application No. 2017-227101 filed with the Japanese Patent Office on Nov. 27, 2017, the entire contents of which are incorporated into this specification by reference.

The invention claimed is:

1. An automatic transmission control method for controlling an automatic transmission including a variator having a primary pulley, a secondary pulley, and a belt, the automatic transmission configured such that a winding diameter of the belt in the primary pulley or the secondary pulley is variable according to a working pressure of the variator formed by a speed change pump, the automatic transmission control method comprising:
  setting a target speed ratio of the variator according to a driving state of a vehicle;
  switching between a first control mode configured to control the speed change pump based on an actual speed ratio being an actual speed ratio of the variator, and a second control mode configured to control the speed change pump based on an actual working pressure being an actual working pressure of the variator;
  in the first control mode,
  calculating the actual speed ratio based on a detected value of a vehicle speed; and
  controlling the speed change pump to cause the actual speed ratio to approach the target speed ratio;
  in the second control mode,
  detecting the actual working pressure; and
  controlling the speed change pump to cause the actual working pressure to approach a target working pressure corresponding to the target speed ratio; and
  selecting the first control mode under a first condition in which the detected value of the vehicle speed is within an allowable range with respect to an actual vehicle speed, and selecting the second control mode under a second condition in which the detected value of the vehicle speed is out of the allowable range.

2. The automatic transmission control method according to claim 1, wherein:
  each of the primary pulley and the secondary pulley includes a fixed pulley and a movable pulley configured to be hydraulically movable relative to the fixed pulley along a rotary shaft of the fixed pulley;
  an oil chamber of the primary pulley and an oil chamber of the secondary pulley communicate with each other through an oil passage; and
  the speed change pump is disposed in the oil passage,
  wherein, in the second control mode, an actual relative pressure of a pressure of the oil chamber of the primary pulley to a pressure of the oil chamber of the secondary pulley is used as the actual working pressure, and the speed change pump is controlled based on the actual relative pressure.

3. The automatic transmission control method according to claim 2, wherein the relative pressure is a difference obtained by subtracting the pressure of the oil chamber of the secondary pulley from the pressure of the oil chamber of the primary pulley.

4. The automatic transmission control method according to claim 3, wherein when the target speed ratio in the second control mode is a speed ratio on a lowest speed side of the automatic transmission, the relative pressure is set to a predetermined pressure smaller than an upper limit pressure required for achieving the target speed ratio.

5. The automatic transmission control method according to claim 3, wherein, in the second control mode, a current value of an electric motor configured to drive the speed change pump is controlled to cause the actual working pressure to approach the target working pressure.

6. The automatic transmission control method according to claim 1, wherein when the vehicle speed is higher than a predetermined value, the first condition is satisfied, and when the vehicle speed is equal to or less than the predetermined value, the second condition is satisfied.

7. An automatic transmission control device for controlling an automatic transmission including a variator having a primary pulley, a secondary pulley, and a belt, the variator configured such that a speed ratio is determined according to a ratio of winding diameters of the belt in the primary pulley and the secondary pulley, the automatic transmission configured such that the winding diameter of the belt in the primary pulley or the secondary pulley is variable according to a working pressure of the variator, the automatic transmission control device comprising:
  a speed change pump configured to form the working pressure of the variator; and
  a controller configured to control the speed change pump, wherein the controller includes:
  a target speed ratio setting unit configured to set a target speed ratio of the variator according to a driving state of a vehicle;

an actual speed ratio calculation unit configured to calculate an actual speed ratio being an actual speed ratio of the variator based on a detected value of a vehicle speed;

an actual working pressure detection unit configured to detect an actual working pressure being an actual working pressure of the variator; and a speed change pump control unit configured to switch between a first control mode configured to control the speed change pump to cause the actual speed ratio to approach the target speed ratio, and a second control mode configured to control the speed change pump to cause the actual working pressure to approach a target working pressure corresponding to the target speed ratio, and wherein the speed change pump control unit is configured to control the speed change pump by the first control mode under a first condition in which the detected value of the vehicle speed is within an allowable range with respect to an actual vehicle speed, and configured to control the speed change pump by the second control mode under a second condition in which the detected value of the vehicle speed is out of the allowable range.

* * * * *